(12) United States Patent
Li et al.

(10) Patent No.: US 11,982,344 B2
(45) Date of Patent: May 14, 2024

(54) ELECTRIC DRIVE POWER TRANSMISSION SYSTEM BOX ASSEMBLY HAVING STEPPED PIN POSITIONING AND MOUNTING METHOD OF ELECTRIC DRIVE POWER TRANSMISSION SYSTEM BOX ASSEMBLY

(71) Applicant: Jing-Jin Electric Technologies Co., Ltd., Beijing (CN)

(72) Inventors: Jianwen Li, Beijing (CN); Xudong Yang, Beijing (CN); Ruikun Wang, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 0 days.

(21) Appl. No.: 18/547,046

(22) PCT Filed: Jun. 8, 2021

(86) PCT No.: PCT/CN2021/098930
§ 371 (c)(1),
(2) Date: Aug. 18, 2023

(87) PCT Pub. No.: WO2022/179003
PCT Pub. Date: Sep. 1, 2022

(65) Prior Publication Data
US 2024/0035557 A1    Feb. 1, 2024

(30) Foreign Application Priority Data

Feb. 23, 2021   (CN) .......................... 202110202229.3

(51) Int. Cl.
*F16H 57/023*    (2012.01)
*F16H 57/021*    (2012.01)
*F16H 57/02*     (2012.01)

(52) U.S. Cl.
CPC ......... *F16H 57/023* (2013.01); *F16H 57/021* (2013.01); *F16H 2057/02034* (2013.01)

(58) Field of Classification Search
CPC ................. F16H 57/023; F16H 57/021; F16H 2057/02034; F16H 2057/0335;
(Continued)

(56) References Cited

U.S. PATENT DOCUMENTS 1,037,510 A * 9/1912 Newmann ........... F16C 33/3706
                                                           384/551
3,891,286 A    6/1975 Zimmer et al.
(Continued)

FOREIGN PATENT DOCUMENTS

CN    203670696 U    6/2014
CN    104747690 A    7/2015
(Continued)

OTHER PUBLICATIONS

International Search Report in PCT/2021/098930, dated Nov. 23, 2021, 4 pages.
(Continued)

*Primary Examiner* — Thomas C Diaz
(74) *Attorney, Agent, or Firm* — ArentFox Schiff LLP (57) ABSTRACT

An electric drive power transmission system box assembly is provided having stepped pin positioning and a mounting method of the electric drive power transmission system box assembly. The box assembly includes a housing shaft string assembly, stepped pins, a first housing, and a first bearing. The housing shaft string assembly includes a housing and a shaft string supported on the housing. Each stepped pin includes a matching section and a guide section, the diameter of the matching section is greater than the diameter of the guide section, a tail end portion of the matching section is fixed in a fixing pin hole of the housing, the first housing (Continued)

is mounted and fixed to the housing shaft string assembly under the guide of the guide section, and a rear end of the shaft string is supported on the first housing by means of the first bearing.

10 Claims, 6 Drawing Sheets

(58) Field of Classification Search
CPC ........ F16H 57/033; F16C 33/60; F16C 19/26; F16C 19/44
See application file for complete search history.

(56) References Cited

U.S. PATENT DOCUMENTS

| | | | |
|---|---|---|---|
| 4,067,093 | A | 1/1978 | Schumacher et al. |
| 5,404,772 | A * | 4/1995 | Jester .................... F16H 57/022 |
| | | | 74/606 R |
| 11,274,702 | B1 * | 3/2022 | Piotrowski .............. F16C 19/26 |
| 2009/0114794 | A1 * | 5/2009 | Rudduck ................ B60N 2/015 |
| | | | 244/118.6 |

FOREIGN PATENT DOCUMENTS

| | | |
|---|---|---|
| CN | 104896025 A | 9/2015 |
| CN | 205715470 U | 11/2016 |
| CN | 106224389 A | 12/2016 |
| CN | 206929338 U | 1/2018 |
| CN | 108662090 A | 10/2018 |
| CN | 207961203 U | 10/2018 |
| CN | 208138396 U | 11/2018 |
| CN | 208812010 U | 5/2019 |
| CN | 209354616 U | 9/2019 |
| CN | 110630603 A | 12/2019 |
| CN | 210938000 U | 7/2020 |
| CN | 112377598 A | 2/2021 |
| CN | 212479578 U | 2/2021 |
| CN | 214788944 U | 11/2021 |
| JP | H01224566 A | 9/1989 |
| JP | H0880754 A | 3/1996 |
| JP | H08114256 A | 5/1996 |
| JP | 2001343053 A | 12/2001 |
| JP | 2002195389 A * | 7/2002 ............ F16C 19/548 |
| JP | 2005106179 A | 4/2005 |
| JP | 4848090 B2 | 12/2011 |

OTHER PUBLICATIONS

Office Action in 202110202229.3, dated Apr. 13, 2022, 8 pages.
Extended European Search Report in EP21927435.4, dated Jan. 19, 2024, 4 pages.
Office Action in EP21927435.4, dated Jan. 31, 2024, 7 pages.
Japaneses Office Action in JP2023-551106, mailed Feb. 27, 2024, 7 pages.

* cited by examiner

ELECTRIC DRIVE POWER TRANSMISSION SYSTEM BOX ASSEMBLY HAVING STEPPED PIN POSITIONING AND MOUNTING METHOD OF ELECTRIC DRIVE POWER TRANSMISSION SYSTEM BOX ASSEMBLY

CROSS-REFERENCE TO RELATED APPLICATIONS

This application is a National Phase of PCT/CN2021/098930, filed on Jun. 8, 2021, which claims priority to Chinese Patent Application No. 202110202229.3, filed on Feb. 23, 2021, the disclosures of each of which are hereby incorporated by reference in their entireties.

TECHNICAL FIELD

The present disclosure belongs to the technical field of gearbox assembly, power assembly, or electrically driven power transmission system, and particularly relates to an electrically driven power transmission system box assembly positioned by stepped pins and the installation method thereof.

BACKGROUND

With the continuous development of automotive industry, the gearbox and the entire power system have to face more complicated operating conditions and higher requirements. To reduce the axial size, the integrated shaft structure supported by multiple bearings is necessary. In the conventional gearbox assembly or power assembly having a multi-bearing integrated shaft structure, the housings are positioned via positioning pins having a single diameter. When the housing assembly provided with the outer ring and rollers of the bearings is assembled onto the housing and shaft string assembly provided with the inner ring of the bearings and positioning pins, there is not enough offset room between positioning pins and pin holes, so that the rollers and the inner ring of the bearings compress each other during the assembly process, and thus surface scratches are formed, which affect the performance and lifespan of the bearing and the entire system.

SUMMARY

With respect to the above problems, the present disclosure discloses a box assembly and the installation method thereof to overcome or at least partially solve the above problems.

In order to achieve the above object, the present disclosure adopts the following technical solutions.

An aspect of the present disclosure discloses an electrically driven power transmission system box assembly positioned by stepped pins. The box assembly comprises: a housing and shaft string assembly, several stepped pins, a first housing, and a first bearing; the housing and shaft string assembly comprises a housing and a shaft string supported on the housing; the stepped pin comprises an engagement section and a guide section, a diameter of the engagement section is greater than a diameter of the guide section, and an end part of the engagement section is fixed in a fixing pin hole of the housing; the first housing is installed and fixed to the housing and shaft string assembly under the guidance of the guide section; and a rear end of the shaft string is supported on the first housing via the first bearing.

Optionally, a gap between the guide section of the stepped pin and a positioning pin hole of the first housing is configured to ensure, during an assembly process of more than half of an axial length of rollers of the first bearing entering a raceway of an inner ring of the first bearing, a radial space between the inner ring of the first bearing and an outer ring of the first bearing and the rollers of the first bearing, to prevent surface scratches on the rollers of the first bearing and the inner ring of the first bearing caused by over-positioning.

Optionally, the gap between the guide section of the stepped pin and the positioning pin hole of the first housing is further configured that, after more than half of the axial length of the rollers of the first bearing entered the raceway of the inner ring of the first bearing, the engagement section of the stepped pin begins to enter the positioning pin hole of the first housing; as the engagement section of the stepped pin enters the positioning pin hole of the first housing and is installed in place, a remaining part of the rollers of the first bearing fully enters the raceway of the inner ring of the first bearing.

Optionally, the diameter of the guide section of the stepped pin is determined based on a radial clearance of the first bearing, a position accuracy of a first bearing seat on the first housing, and a position accuracy of the positioning pin hole of the first housing.

Optionally, the lengths of the guide section and the engagement section of the stepped pin outside the housing are determined based on axial sizes of the housing, the first housing, and the shaft string.

Optionally, the first bearing is a split cylindrical roller bearing, an outer ring of the split cylindrical roller bearing is installed on a bearing seat of the first housing, and an inner ring of the split cylindrical roller bearing and rollers of the split cylindrical roller bearing are fixed at a rear end of the shaft string.

Optionally, the housing and shaft string assembly comprises a middle housing and a second housing, and the shaft string is fixedly supported on the middle housing and the second housing via a middle bearing and a second bearing, respectively.

Optionally, the second bearing is disposed at a front end of the shaft string, the middle bearing is disposed on a side of the middle housing that is close to the rear end of the shaft string, and the second housing and the middle housing are fixed by positioning pins.

Another aspect of the present disclosure discloses a method for installing the box assembly as stated in any of the above items. The method comprises:
step 1: installing the shaft string on the housing and shaft string assembly; and
step 2: assembling the first housing, on which the outer ring of the first bearing and the rollers of the first bearing are installed or only the outer ring of the first bearing is installed, onto the housing and shaft string assembly under guidance of the guide section of the stepped pin.

Optionally, the step 2 specifically comprises:
during an assembly process of more than half of an axial length of the rollers of the first bearing entering a raceway of the inner ring of the first bearing, a radial space between the inner ring of the first bearing and the outer ring of the first bearing and the rollers of the first bearing can be ensured, to prevent surface scratches on the rollers of the first bearing and the inner ring of the first bearing caused by over-positioning;

after more than half of the axial length of the rollers of the first bearing entered the raceway of the inner ring of the first bearing, the engagement section of the stepped pin begins to enter the positioning pin hole of the first housing; as the engagement section of the stepped pin enters the positioning pin hole of the first housing, a remaining part of the rollers of the first bearing fully enters the raceway of the inner ring of the first bearing.

The advantages and beneficial effects of the present disclosure are as follows.

The electrically driven box assembly positioned by stepped pins of the present disclosure utilizes the larger radial gap between the guide section of the stepped pin and the positioning pin hole of the first housing to prevent surface scratches on the raceway of the first bearing caused by the compression between the inner ring and rollers of the first bearing during the assembly process of the shaft string and the first housing, thereby improving the service life of the bearing and the entire system.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings:

FIG. 1 (*a*) is a cross-sectional view of a box assembly positioned by stepped pins according to an embodiment of the present disclosure;

FIG. 1 (*b*) is a cross-sectional view of the initial position in the assembly process of a first bearing of the box assembly positioned by stepped pins according to an embodiment of the present disclosure;

FIG. 1 (*c*) is a cross-sectional view of the assembly process of a first bearing of the box assembly positioned by stepped pins according to an embodiment of the present disclosure, where the stepped pin begins to enter the engagement section;

FIG. 1 (*d*) is a cross-sectional view of the assembly process of a first bearing of the box assembly positioned by stepped pins according to another embodiment of the present disclosure, where the bearing rollers fully enter the raceway of the inner ring;

FIG. 2 (*a*) is a cross-sectional view of a box assembly positioned by stepped pins according to another embodiment of the present disclosure;

FIG. 2 (*b*) is a cross-sectional view of the assembly process of a first bearing of the box assembly positioned by stepped pins according to another embodiment of the present disclosure, where the stepped pin begins to enter the engagement section.

In the drawings: 1. second housing; 2. middle housing; 3. first housing; 4. housing and shaft string assembly; 5. stepped pin; 6. outer ring of first bearing (rear bearing); 7. roller of first bearing (rear bearing); 8. inner ring of first bearing (rear bearing); 9. shaft string; 10. second bearing; 11. middle bearing.

DETAILED DESCRIPTION

In order to make the object, technical solutions, and advantages of the present disclosure clearer, the present disclosure will be described clearly and completely in conjunction with the specific embodiments and corresponding drawings. Obviously, the embodiments described are only part of rather than all of the embodiments of the present disclosure. Based on the embodiments in the present disclosure, all other embodiments obtained by those of ordinary skill in the art without paying creative work shall fall within the protection scope of the present disclosure.

It should be understood that the terms "comprise/include", "consist of" or any other variants are intended to cover non-exclusive inclusion, so that the product, apparatus, process or method including a series of elements may not only include those elements, but may also include other elements not stated explicitly, or elements inherent to the product, apparatus, process or method. Without more limitations, an element defined by the phrase "comprise/include" or "consist of" does not exclude the case that there are other same elements in the product, apparatus, process or method including the element.

It should also be understood that, orientation or positional relationship indicated by the terms "upper", "lower", "front", "rear", "left", "right", "top", "bottom", "inside", "outside", etc. are orientation or positional relationship based on the drawings, which are merely for convenience of describing the present disclosure and simplifying the description, rather than indicating or implying that the device, component or structure referred to must have a specific orientation, or must be constructed and operated with a specific orientation, they should not be construed as limiting the present disclosure.

In this embodiment, the right represents the front part, and the left represents the rear part.

In the present disclosure, unless otherwise expressly specified and defined, the terms "installed", "connected", "fixed" and the like should be understood in a broad sense, for example, it may be fixedly connected, or removably connected, or integrally connected; it may also be mechanically connected or electrically connected; it may also be directly connected or indirectly connected through a middleware; it may also be internally communicated or interacted between two components. For a person of ordinary skill in the art, the specific meaning of these terms in the present disclosure should be understood according to specific situations.

The technical solutions provided by the embodiments of the present disclosure are described in detail in conjunction with the accompanying drawings.

Figure 1A:
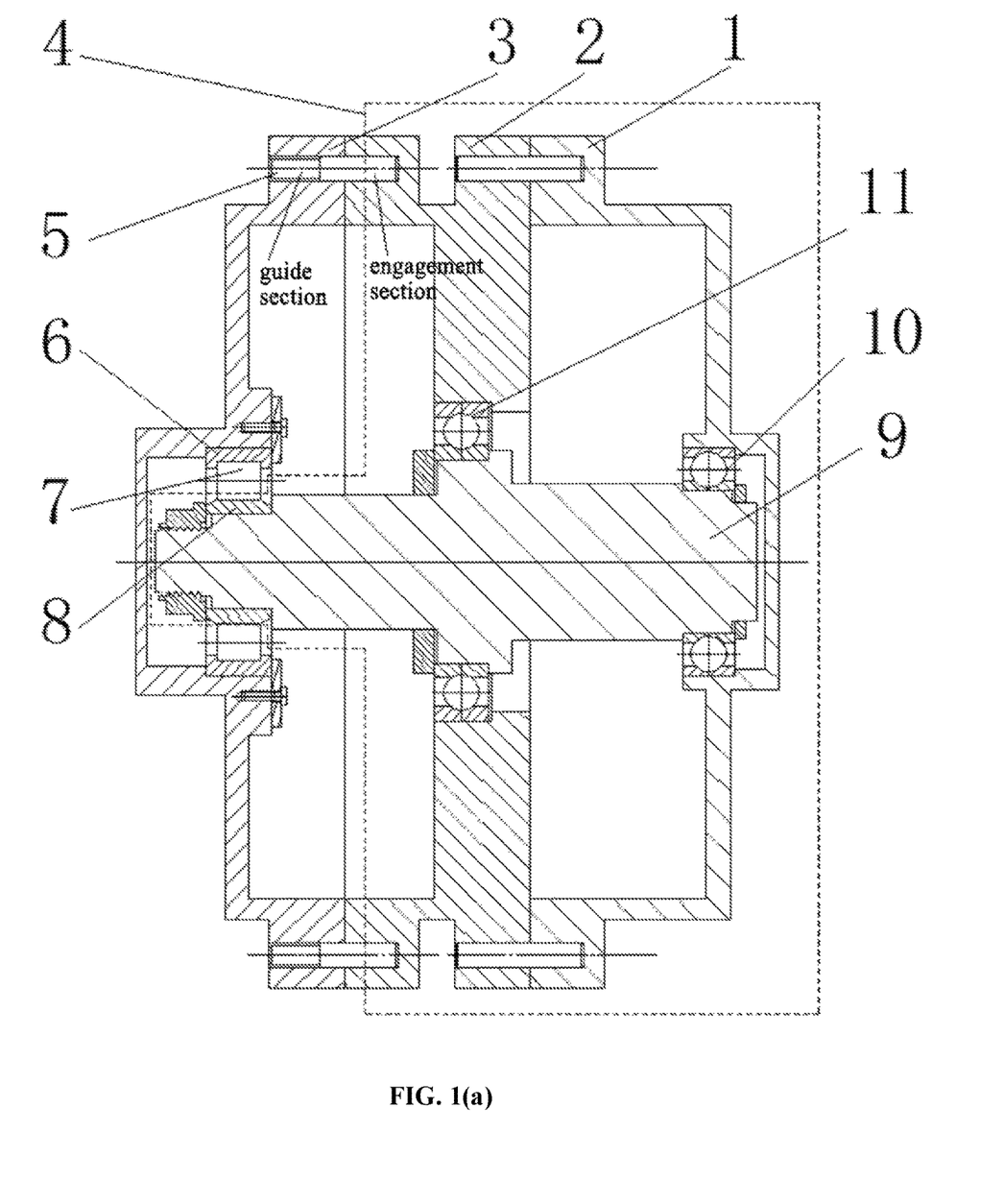
Figure 1B:
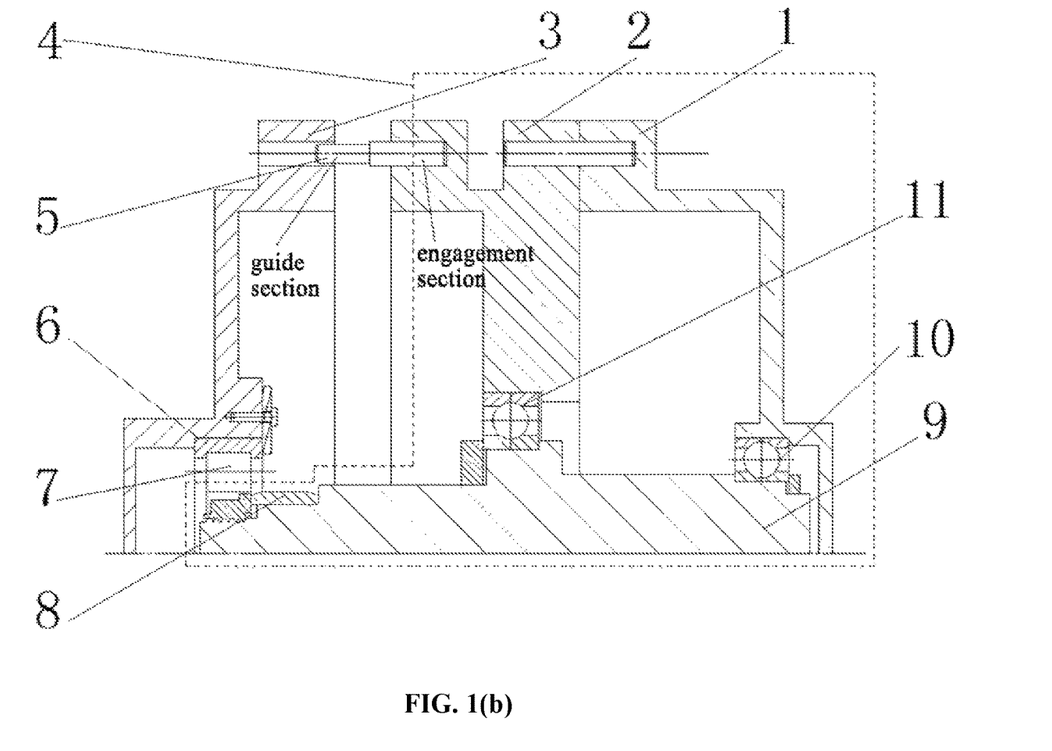
Figure 1C:
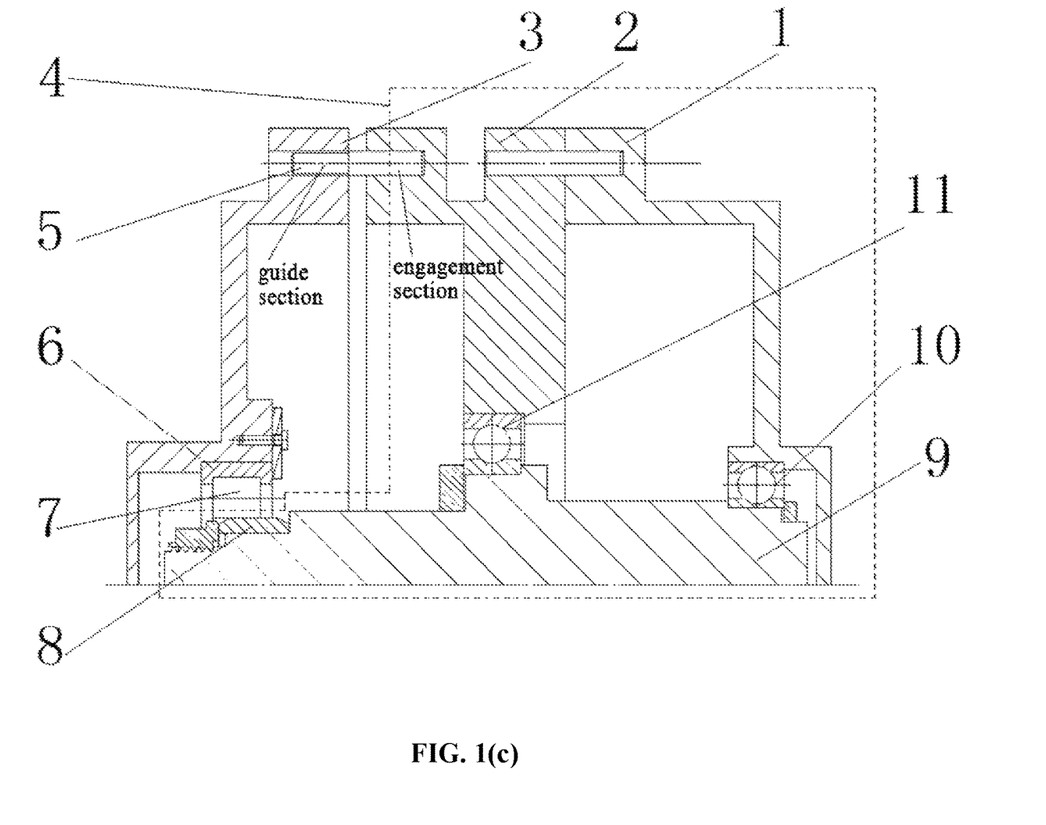
Figure 1D:
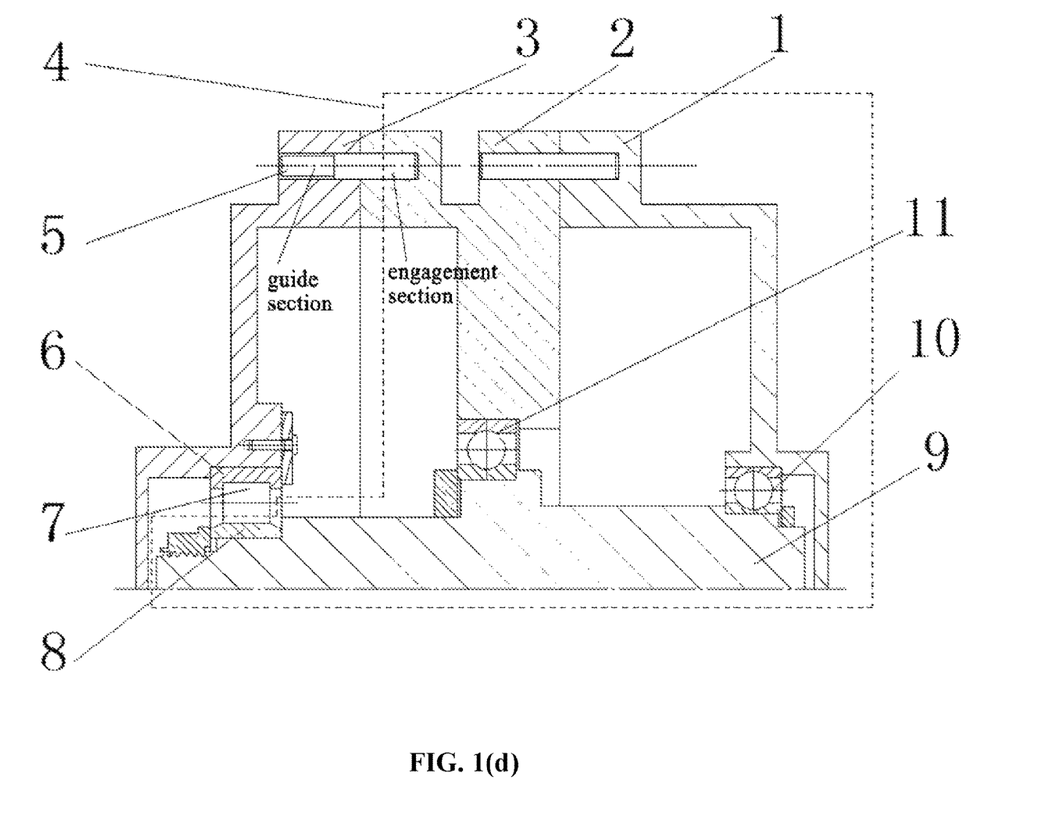
Figure 2A:
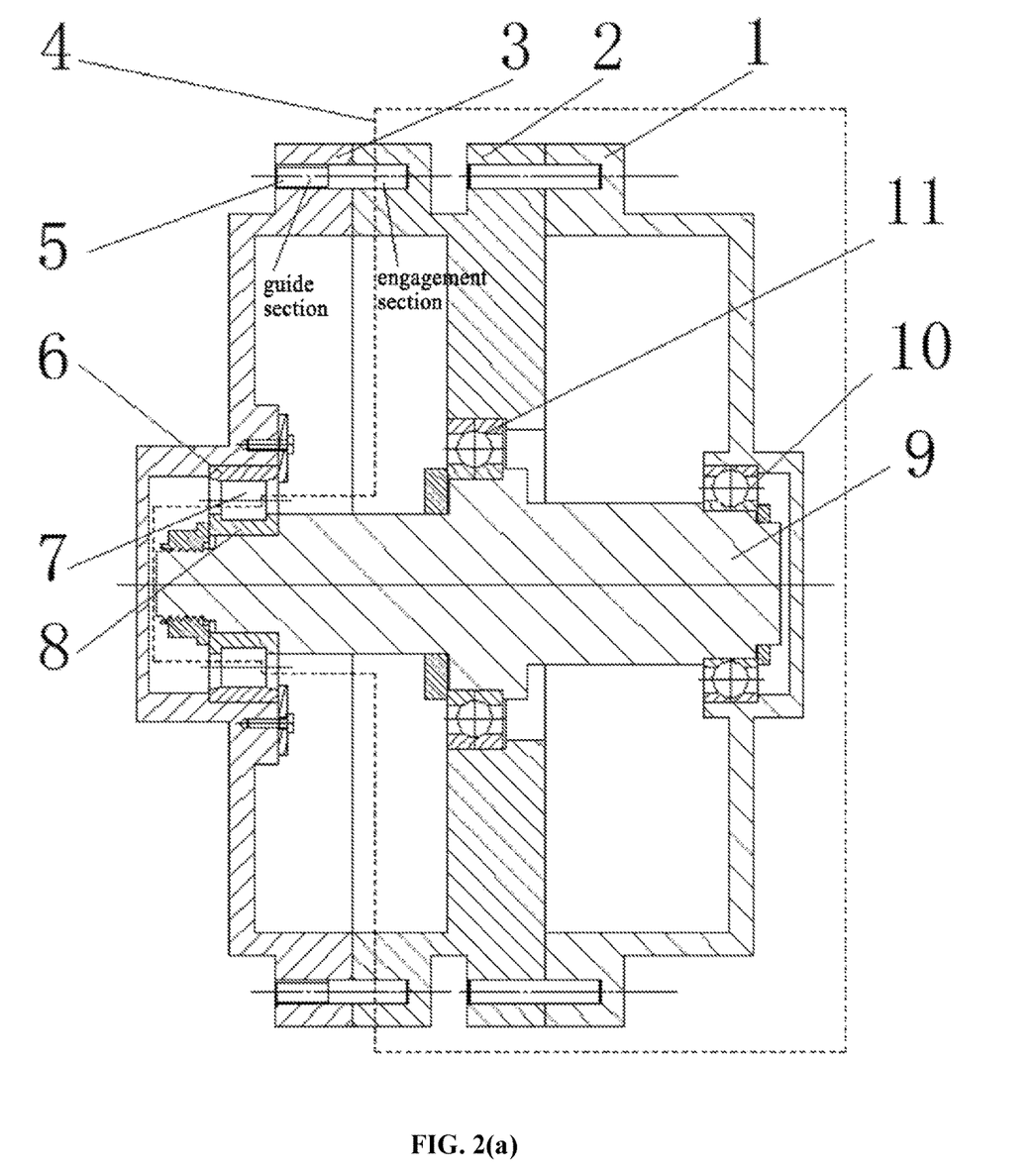
Figure 2B:
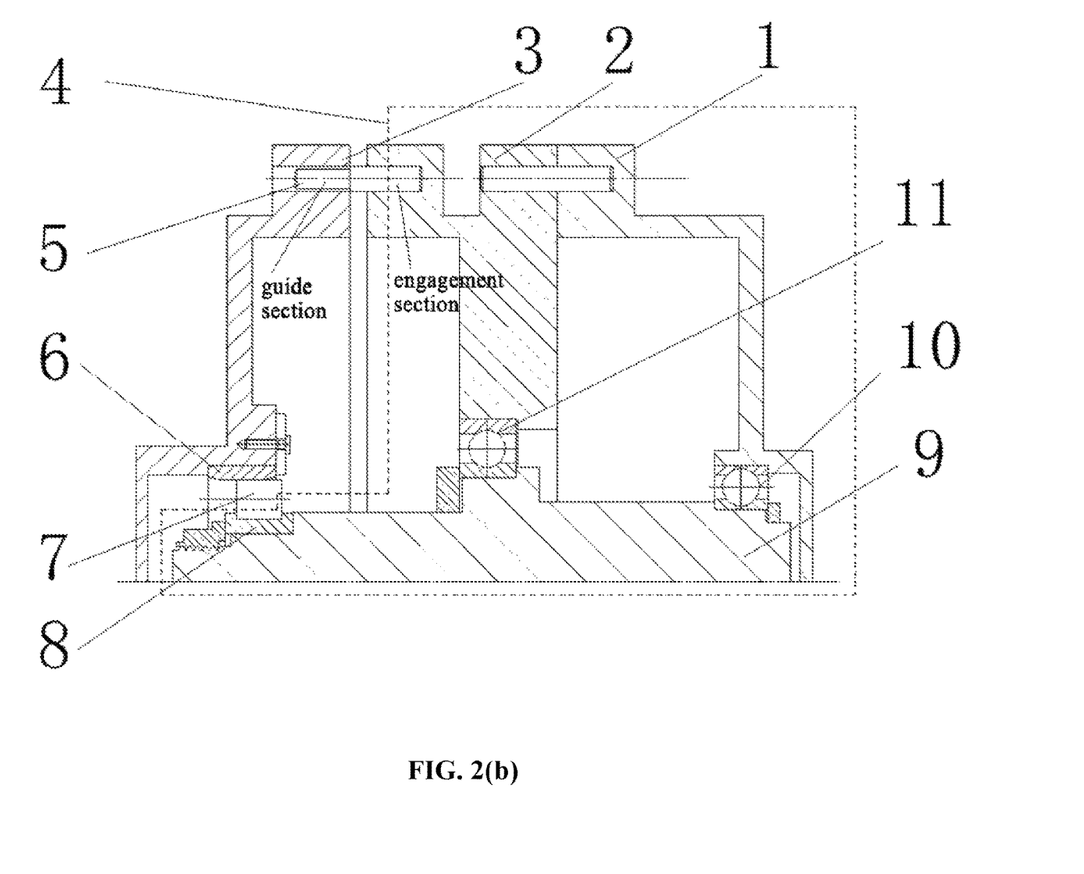

Refer to FIGS. 1 and 2, a specific embodiment of the present disclosure discloses an electrically driven power transmission system box assembly positioned by stepped pins. The electrically driven power transmission system comprises a power source, transmission components, vehicle control components, etc.

The box assembly specifically comprises: a housing and shaft string assembly 4, several stepped pins 5, a first housing 3, and a first bearing 6-8. The housing and shaft string assembly 4 comprises a housing and a shaft string 9 supported on the housing. The stepped pin 5 comprises an engagement section and a guide section. The diameter of the engagement section is larger than the diameter of the guide section. The engagement section is used to achieve the fixation between the housings. The engagement section and the housing are preferably in an interference fit. In order to achieve connection and fixation, at least a part of the engagement section must be connected to both the first housing and the housing of the housing and shaft string assembly. As shown in FIGS. 1 and 2, the end part of the engagement section is fixed in the fixing pin hole of the housing.

The guide section is provided to facilitate the fixation of the first housing 3 onto the housing and shaft string assembly and prevent scratching the first bearing during installation. Since the diameter of the guide section is less than the diameter of the engagement section, when the first housing 3 is installed and fixed to the housing and shaft string assembly under the guidance of the guide section, there is a sufficient radial gap left between the inner ring of the first bearing, the rollers of the first bearing, and the outer ring of the first bearing to avoid scratches. After the above installation is completed, the rear end of the shaft string can be supported on the first housing via the first bearing.

Preferably, the gap between the guide section of the stepped pin 5 and a positioning pin hole of the first housing 3 is configured to ensure, during an assembly process of more than half of an axial length of the rollers 7 of the first bearing entering a raceway of the inner ring 8 of the first bearing, a sufficient radial space between the inner ring 8 of the first bearing and an outer ring 6 of the first bearing and the rollers 7 of the first bearing, to prevent surface scratches on the rollers 7 of the first bearing and the inner ring 8 of the first bearing caused by over-positioning.

Furthermore, the gap between the guide section of the stepped pin 5 and the positioning pin hole of the first housing 3 is further configured that, after more than half of the axial length of the rollers 7 of the first bearing entered the raceway of the inner ring 8 of the first bearing, the engagement section of the stepped pin 5 begins to enter the positioning pin hole of the first housing 3; as the engagement section of the stepped pin 5 enters the positioning pin hole of the first housing 3 and is installed in place, the remaining part of the rollers 7 of the first bearing fully enters the raceway of the inner ring 8 of the first bearing.

Preferably, the diameter of the guide section of the stepped pin 5 is less than the diameter of the positioning pin hole of the first housing 3. The diameter of the guide section is determined based on a radial clearance of the first bearing, a position accuracy of a first bearing seat on the first housing 3, and a position accuracy of the positioning pin hole of the first housing 3.

Preferably, the lengths of the guide section and the engagement section of the stepped pin 5 outside the housing, the proportional relationship between the lengths, etc., are determined based on the size of the housing (especially the first housing) and the size of the shaft string.

Furthermore, in a preferred embodiment, the first bearing is a split cylindrical roller bearing, the outer ring of the split cylindrical roller bearing is installed on the bearing seat of the first housing 3, and the inner ring 8 of the first bearing of the split cylindrical roller bearing and the rollers 7 of the first bearing of the split cylindrical roller bearing are fixed at a rear end of the shaft string 9.

Specifically, the housing and shaft string assembly 4 comprises a middle housing 2 and a second housing 1, and the shaft string 9 is fixedly supported on the middle housing 2 and the second housing 1 via the middle bearing 11 and the second bearing 10, respectively.

Moreover, the second bearing 10 is disposed at a front end of the shaft string 9, the middle bearing 11 is disposed on a side of the middle housing 2 that is close to a rear end of the shaft string 9, and the second housing 1 and the middle housing 2 are fixed via positioning pins.

Another aspect of the present disclosure discloses a method for installing the box assembly as stated in any of the above items. The method comprises:

step 1: installing the shaft string 9 on the housing and shaft string assembly 4; and step 2: assembling the first housing 3, on which the outer ring 6 of the first bearing and the rollers 7 of the first bearing are installed or only the outer ring 6 of the first bearing is installed, onto the housing and shaft string assembly 4 under the guidance of the guide section of the stepped pin 5.

Optionally, the step 2 specifically comprises:

during an assembly process of more than half of an axial length of the rollers 7 of the first bearing entering the raceway of the inner ring 8 of the first bearing, a sufficient radial space between the inner ring 8 of the first bearing and the outer ring 6 of the first bearing and the rollers 7 of the first bearing can be ensured, to prevent surface scratches on the rollers 7 of the first bearing and the inner ring 8 of the first bearing caused by over-positioning;

after more than half of the axial length of the rollers 7 of the first bearing entered the raceway of the inner ring 8 of the first bearing, the engagement section of the stepped pin 5 begins to enter the positioning pin hole of the first housing 3; as the engagement section of the stepped pin 5 enters the positioning pin hole of the first housing 3, the remaining part of the rollers 7 of the first bearing fully enters the raceway of the inner ring 8 of the first bearing.

It will be further explained below in conjunction with two specific embodiments.

First Embodiment

The first embodiment discloses an electrically driven gearbox assembly positioned by stepped pins. As shown in FIG. 1 (a), it comprises: stepped pins 5 having a guide section and an engagement section and installed on a bonding surface of the housing; a (front) middle housing 2 and a first housing (rear housing) 3 positioned by using stepped pins, and a second housing (front housing) 1 connected to the middle housing; a second bearing (front bearing) 10, a middle bearing 11 and a first bearing (rear bearing) that are respectively installed at bearing seats of the three housings; and a shaft string 9 supported by the three bearings.

In this embodiment, there is no specific limitation on the selection of the rear bearing. The outer ring 6 and rollers 7 of the rear bearing are installed at the bearing seat of the rear housing 3, and the inner ring 8 of the rear bearing is fixed on the outer circumference of the shaft string 9.

In this embodiment, as shown in FIG. 1 (b), the shaft string 9 is first assembled into the front housing 1 and the middle housing 2 to obtain a housing and shaft string assembly 4 on which the inner ring 8 of the rear bearing and two positioning stepped pins 5 are installed; then, the rear housing assembly on which the outer ring 6 and rollers 7 of the rear bearing are installed is assemble onto the housing and shaft string assembly 4. As the guide section of the stepped pin 5 installed in the housing and shaft string assembly 4 enters the positioning pin hole at the bonding surface of the rear housing, the outer ring 6 and rollers 7 of the rear bearing gradually enter the raceway of the inner ring 8 of the rear bearing, thus completing the assembly.

In this embodiment, there is a larger radial gap between the guide section of the stepped pin 5 and the positioning pin hole at the bonding surface of the rear housing 3 to ensure, during the assembly process of more than half of the axial length of the rollers 7 of the rear bearing entering the raceway of the inner ring 8 of the rear bearing, a sufficient radial space between the inner ring 8 of the rear bearing and the outer ring 6 and rollers 7 of the rear bearing, to prevent surface scratches on the rollers 7 and the inner ring 8 of the rear bearing caused by over-positioning. As shown in FIG. 1 (c), after more than half of the axial length of rollers 7 of the rear bearing enter the raceway of the inner ring 8 of the rear bearing, the engagement section of the stepped pin 5 begins to enter the positioning pin hole of the rear housing; As shown in FIG. 1 (d), as the engagement section of the stepped pin 5 enters the positioning pin hole of the rear housing and is installed in place, the remaining part of the rollers 7 of the rear bearing fully enters the raceway of the inner ring 8 of the rear bearing.

In this embodiment, during the assembly process of the rollers 7 of the rear bearing entering the raceway of the inner ring 8 of the rear bearing, in order to ensure that the engagement section of the stepped pin 5 will not enter the positioning pin hole until more than half of the axial length of the rollers 7 of the rear bearing enters the raceway of the inner ring 8 of the rear bearing, the axial length of the transition section of the stepped pin 5 needs to be determined based on the sizes of relevant components and the axial size of the entire structure.

In this embodiment, during the assembly process of more than half of the axial length of the rollers 7 of the rear bearing entering the raceway of the inner ring 8 of the rear bearing, in order to ensure a sufficient radial space between the rollers 7 and the inner ring 8 of the rear bearing to prevent surface scratches on the raceway of the bearing, the outer diameter size and tolerance of the guide section of the stepped pin 5 needs to be determined based on the radial clearance of the rear bearing, the position accuracy of the rear bearing seat, the position accuracy of the positioning pin hole, etc.

The first embodiment utilizes the larger radial gap between the guide section of the stepped pin and the positioning pin hole to prevent surface scratches on the raceway of the rear bearing caused by the compression of the inner ring and rollers of the rear bearing during the assembly process of the shaft string and the housing supported by the three bearings, thereby improving the service life of the bearing and the entire system.

Second Embodiment

The second embodiment discloses an electrically driven power transmission system positioned by stepped pins. As shown in FIG. 2 (a), it comprises: stepped pins 5 having a guide section and an engagement section and installed on the bonding surface of the housing; a middle housing 2 and a rear housing 3 positioned by using stepped pins; a front housing 1 connected to the middle housing; a front bearing 10, a middle bearing 11 and a rear bearing that are respectively installed at bearing seats of the three housings; and a shaft string 9 supported by the three bearings.

The second embodiment differs from the first embodiment in that, as shown in FIG. 2 (a), the rear bearing in this embodiment is a split cylindrical roller bearing. The outer ring 6 of the rear bearing is installed at the bearing seat of the rear housing 3, and the inner ring 8 and rollers 7 of the rear bearing are fixed on the outer circumference of the shaft string 9.

In this embodiment, the shaft string 9 is first assembled into the front housing 1 and the middle housing 2 to obtain a housing and shaft string assembly 4 on which the inner ring 8 and rollers 7 of the rear bearing and two positioning stepped pins 5 are installed; then, the rear housing assembly on which the outer ring 6 of the rear bearing is installed is assemble onto the housing and shaft string assembly 4. As the guide section of the stepped pin 5 installed in the housing and shaft string assembly 4 enters the positioning pin hole at the bonding surface of the rear housing, the inner ring 8 and rollers 7 of the rear bearing gradually enter the raceway of the outer ring 6 of the rear bearing, thus completing the assembly. FIG. 2 (b) shows the state that more than half of the axial length of the rollers 7 of the rear bearing enters the raceway of the outer ring 6 of the rear bearing, and at the same time the stepped pin 5 begins to enter the engagement stage.

This embodiment utilizes the larger radial gap between the guide section of the stepped pin and the positioning pin hole to prevent surface scratches on the raceway of the bearing caused by the compression of the inner surface of the outer ring and rollers of the bearing during the assembly process of the shaft string and the housing supported by the three bearings, thereby improving the service life of the bearing and the entire system.

The above only describes the embodiments of the present disclosure, and is not intended to limit the scope of protection of the present disclosure. Any modification, equivalent substitution, improvement, expansion, etc. made in the spirit and principle of the present disclosure shall all fall within the protection scope of the present disclosure.

What is claimed is:

1. An electrically driven power transmission system box assembly positioned by stepped pins, the box assembly comprising:
    a housing and shaft string assembly;
    a plurality of stepped pins;
    a first housing; and
    a first bearing;
    wherein the housing and shaft string assembly comprise a housing and a shaft string supported on the housing;
    wherein the plurality of stepped pins each comprise an engagement section and a guide section, a diameter of the engagement section is greater than a diameter of the guide section, and an end part of the engagement section is fixed in a fixing pin hole of the housing;
    wherein the first housing is installed and fixed to the housing and shaft string assembly under guidance of the guide section;
    wherein a rear end of the shaft string is supported on the first housing via the first bearing;
    wherein the housing further comprises a middle housing and a second housing, and the shaft string is fixedly supported on the middle housing and the second housing via a middle bearing and a second bearing, respectively,
    wherein a gap between the guide section of the stepped pin and a positioning pin hole of the first housing is configured to ensure, during an assembly process of more than half of an axial length of rollers of the first bearing entering a raceway of an inner ring of the first bearing, a radial space between the inner ring of the first bearing and an outer ring of the first bearing and the rollers of the first bearing, to prevent surface scratches on the rollers of the first bearing and the inner ring of the first bearing caused by over-positioning; and
    wherein the diameter of the guide section of the stepped pin is based on a radial clearance of the first bearing, a position accuracy of a first bearing seat on the first housing, and a position accuracy of the positioning pin hole of the first housing.

2. The box assembly according to claim 1, wherein the gap between the guide section of the stepped pin and the positioning pin hole of the first housing is further configured that, after more than half of the axial length of the rollers of the first bearing entered the raceway of the inner ring of the first bearing, the engagement section of the stepped pin begins to enter the positioning pin hole of the first housing; as the engagement section of the stepped pin enters the positioning pin hole of the first housing and is installed in place, a remaining part of the rollers of the first bearing fully enters the raceway of the inner ring of the first bearing.

3. A method for installing the box assembly according to claim 2, the method comprising:
   installing the shaft string on the housing and shaft string assembly; and
   assembling the first housing, on which the outer ring of the first bearing and the rollers of the first bearing are installed or only the outer ring of the first bearing is installed, onto the housing and shaft string assembly under guidance of the guide section of the stepped pin.

4. The box assembly according to claim 1, wherein lengths of the guide section and the engagement section of the stepped pin outside the housing are determined based on axial sizes of the housing, the first housing, and the shaft string.

5. A method for installing the box assembly according to claim 4, the method comprising:
   installing the shaft string on the housing and shaft string assembly; and
   assembling the first housing, on which the outer ring of the first bearing and the rollers of the first bearing are installed or only the outer ring of the first bearing is installed, onto the housing and shaft string assembly under guidance of the guide section of the stepped pin.

6. The box assembly according to claim 1, wherein the second bearing is disposed at a front end of the shaft string, the middle bearing is disposed on a side of the middle housing that is close to a rear end of the shaft string, and the second housing and the middle housing are fixed by positioning pins.

7. A method for installing the box assembly according to claim 6, the method comprising:
   installing the shaft string on the housing and shaft string assembly; and
   assembling the first housing, on which the outer ring of the first bearing and the rollers of the first bearing are installed or only the outer ring of the first bearing is installed, onto the housing and shaft string assembly under guidance of the guide section of the stepped pin.

8. A method for installing the box assembly according to claim 1, further comprising the steps of:
   step 1: installing the shaft string on the housing and shaft string assembly; and
   step 2: assembling the first housing, on which the outer ring of the first bearing and the rollers of the first bearing are installed or only the outer ring of the first bearing is installed, onto the housing and shaft string assembly under guidance of the guide section of the stepped pin.

9. The method according to claim 8, wherein the assembling of the first housing comprises:
   during an assembly process of more than half of an axial length of the rollers of the first bearing entering a raceway of the inner ring of the first bearing, a radial space between the inner ring of the first bearing and the outer ring of the first bearing and the rollers of the first bearing can be ensured, to prevent surface scratches on the rollers of the first bearing and the inner ring of the first bearing caused by over-positioning; and
   after more than half of the axial length of the rollers of the first bearing entered the raceway of the inner ring of the first bearing, the engagement section of the stepped pin begins to enter the positioning pin hole of the first housing; as the engagement section of the stepped pin enters the positioning pin hole of the first housing, a remaining part of the rollers of the first bearing fully enters the raceway of the inner ring of the first bearing.

10. A method for installing the box assembly according to claim 1, the method comprising:
   installing the shaft string on the housing and shaft string assembly; and
   assembling the first housing, on which the outer ring of the first bearing and the rollers of the first bearing are installed or only the outer ring of the first bearing is installed, onto the housing and shaft string assembly under guidance of the guide section of the stepped pin.

\* \* \* \* \*